US010936817B2

(12) United States Patent
Agarwal et al.

(10) Patent No.: US 10,936,817 B2
(45) Date of Patent: Mar. 2, 2021

(54) NEURAL NETWORK ARCHITECTURE FOR SUBTLE HATE SPEECH DETECTION

(71) Applicant: Conduent Business Services, LLC, Dallas, TX (US)

(72) Inventors: Sakshi Agarwal, West Bengal (IN); Sandya Srivilliputtur Mannarswamy, Karnataka (IN)

(73) Assignee: CONDUENT BUSINESS SERVICES, LLC, Florham Park, NJ (US)

( * ) Notice: Subject to any disclaimer, the term of this patent is extended or adjusted under 35 U.S.C. 154(b) by 127 days.

(21) Appl. No.: 16/265,232

(22) Filed: Feb. 1, 2019

(65) Prior Publication Data
US 2020/0250267 A1 Aug. 6, 2020

(51) Int. Cl.
G06F 17/27 (2006.01)
G06F 40/289 (2020.01)
G06N 3/04 (2006.01)
G06F 16/958 (2019.01)
G06N 3/08 (2006.01)
G06F 40/242 (2020.01)

(52) U.S. Cl.
CPC .......... *G06F 40/289* (2020.01); *G06F 16/972* (2019.01); *G06N 3/0445* (2013.01); *G06N 3/08* (2013.01); *G06F 40/242* (2020.01)

(58) Field of Classification Search
CPC .... G06F 16/972; G06F 40/242; G06F 40/289; G06F 40/30; G06N 3/08; G06N 3/0445
USPC ........................................................... 704/9
See application file for complete search history.

(56) References Cited

U.S. PATENT DOCUMENTS

| 4,864,502 | A  | * | 9/1989  | Kucera ................. G06F 40/253 704/8 |
| 6,003,003 | A  | * | 12/1999 | Asghar .................... G10L 15/02 704/243 |
| 6,044,343 | A  | * | 3/2000  | Cong ..................... G10L 15/063 704/222 |
| 9,715,496 | B1 | * | 7/2017  | Sapoznik .............. G06F 16/245 |
| 9,842,105 | B2 | * | 12/2017 | Bellegarda ........... G06F 40/205 |
| 10,346,524 | B1 | * | 7/2019 | Zheng .................. G06N 3/0454 |
| 2016/0162576 | A1 | * | 6/2016 | Arino de la Rubia ..................... H04L 51/14 707/739 |
| 2017/0091168 | A1 | * | 3/2017 | Bellegarda ........... G06F 40/274 |
| 2017/0193545 | A1 | * | 7/2017 | Zhou .................. G06Q 30/0243 |

(Continued)

*Primary Examiner* — Khai N. Nguyen
(74) *Attorney, Agent, or Firm* — Jones Robb, PLLC

(57) ABSTRACT

Additional background information is used with a trained neural network based model to help classify whether text is a subtly and/or ambiguously offensive. This additional background information can come from different sources such as the article on which the comment was made, world knowledge about the external entities (e.g., Wikipedia, Urban Dictionary), phrases referenced in the text being classified, and, the context of the previous comments/text in the thread. The background information is retrieved based on key entities (e.g., people, places things) and/or key phrases in the comment. Sentence matrix encodings are built for both the comment and the background information. The background information encoding is used to condition the comment encoding. The background information encoding, and the conditioned comment encoding are fed to a trained multi-level perceptron to classify the comment as hate speech or non-hate speech.

20 Claims, 5 Drawing Sheets

(56) References Cited

U.S. PATENT DOCUMENTS

| | | | |
|---|---|---|---|
| 2017/0200077 A1* | 7/2017 | Weston | G06F 40/279 |
| 2018/0150739 A1* | 5/2018 | Wu | G06Q 10/1053 |
| 2018/0336183 A1* | 11/2018 | Lee | G06F 40/30 |
| 2019/0005090 A1* | 1/2019 | Zhang | G06F 40/30 |
| 2019/0236139 A1* | 8/2019 | DeFelice | G06N 3/0472 |
| 2019/0244603 A1* | 8/2019 | Angkititrakul | G06F 40/30 |
| 2019/0286700 A1* | 9/2019 | Jayaraman | G06N 3/0454 |
| 2019/0355346 A1* | 11/2019 | Bellegarda | G06N 5/022 |
| 2020/0005046 A1* | 1/2020 | Attorre | G06K 9/00718 |
| 2020/0073902 A1* | 3/2020 | Milazzo | G06F 16/3328 |
| 2020/0089652 A1* | 3/2020 | Jayaraman | G06F 40/30 |
| 2020/0089765 A1* | 3/2020 | Jayaraman | G06F 16/3347 |
| 2020/0142999 A1* | 5/2020 | Pedersen | G06F 16/35 |
| 2020/0160196 A1* | 5/2020 | Ramakrishnan | G06F 40/30 |

* cited by examiner

NEURAL NETWORK ARCHITECTURE FOR SUBTLE HATE SPEECH DETECTION

TECHNICAL BACKGROUND

Modern computerized media platforms (e.g., social networks, message boards, websites, etc.) often allow users to post and/or comment for other users to see. However, some posts/comments are offensive causing the loss of users, loss of reputation, and/or may violate the terms of service for the platform. Unfortunately, human beings may express hateful or offensive ideas in subtle and implicit ways which are not detectable by typical (e.g., profanity based) artificial intelligence based hate speech detectors. Once detected, hate speech may be flagged for further review by a user.

OVERVIEW

In an embodiment, a method of detecting subtle has speech includes providing a neural network based model which has been trained to identify hate speech for an input text sequence. This neural network based model includes a first encoder that generates a first representation based on the input text sequence. This first encoder includes a first embedding module. This first embedding module generates a sentence matrix based on the input text sequence. The first encoder also includes a first neural network encoder that generates the first representation based on the sentence matrix. The neural network based model also includes a second encoder that generates a second representation based on background information. This second encoder includes a second embedding module that generates a background information matrix based on the background information. The second encoder also includes a second neural network encoder that generates the second representation based on the background information matrix. The neural network based model also includes a cross-text interaction module that generates a third representation based on the first representation conditioned on the second representation. The neural network based model also includes a neural network classifier that receives the second representation and the third representation. The method also includes receiving the input text sequence containing a first sequence of words. The method also includes receiving the background information containing a second sequence of words. The method also includes, with a processor, determining a classification for the input text sequence using the neural network based model and outputting information based on the classification.

In an embodiment, a method includes receiving an input text sequence containing a first sequence of words. The method further includes receiving background information containing a second sequence of words. The method further includes generating a sentence matrix based on the first sequence of words. The method further includes encoding the sentence matrix using a recurrent neural network based encoder to generate a first representation of the first sequence of words. The method further includes generating a background information matrix based on the second sequence of words. The method further includes encoding the background information matrix using the recurrent neural network based encoder to generate a second representation of the second sequence of words. The method further includes generating a third representation by conditioning the first representation using the second representation. And, the method further includes generating an output classification by inputting the third representation and the second representation to a trained multilevel perceptron classifier.

In an embodiment, a system, comprises a memory that stores a neural network model, an input component, a background information, a processor, and an output component. The neural network based model has been trained to identify hate speech for an input text sequence. The neural network based model comprises: a first encoder, a second encoder, a cross-text interaction module, and a neural network classifier. The first encoder generates a first representation based on the input text sequence. The first encoder includes a first embedding module that generates a sentence matrix based on the input text sequence. The first encoder also includes a first neural network encoder that generates the first representation based on the sentence matrix. The second encoder that generates a second representation based on background information. The second encoder includes a second embedding module that generates a background information matrix based on the background information. The second encoder includes a second neural network encoder that generates the second representation based on the background information matrix. The cross-text interaction module generates a third representation based on the first representation conditioned on the second representation. The neural network classifier receives the second representation and the third representation. The input component receives the input text sequence containing the first sequence of words. The background information component receives the background information containing the second sequence of words. The processor determines a classification for the input text sequence using the neural network model. And, the output component outputs information based on the classification.

DETAILED DESCRIPTION

In an embodiment, additional background information is used with a trained neural network based model to help classify whether text is subtly and/or ambiguously offensive. This additional background information can come from different sources such as the article on which the comment was made, world knowledge about the external entities (e.g., Wikipedia, Urban Dictionary), phrases referenced in the text being classified, and, the context of the previous comments/text in the thread.

The background information is retrieved based on key entities (e.g., people, places things) and/or key phrases in the comment. Sentence matrix encodings are built for both the comment and the background information. The background information encoding is used to condition the comment encoding. The background information encoding, and the conditioned comment encoding are fed to a trained multilevel perceptron to classify the comment as hate speech or non-hate speech.

Figure 1:
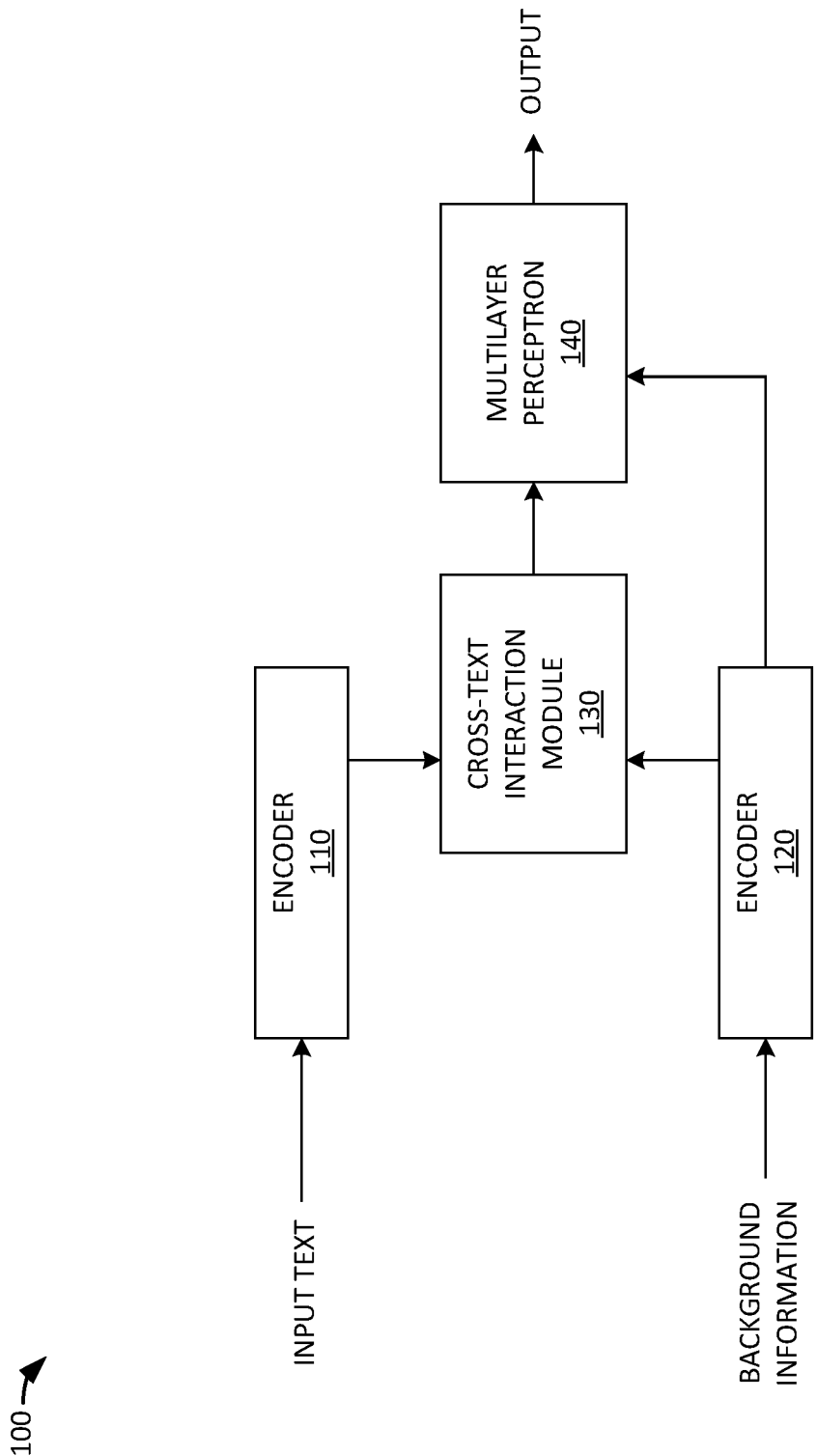
FIG. 1 is a block diagram illustrating a text classifier.

FIG. 1 is a block diagram illustrating a text classifier. In FIG. 1, text classifier 100 comprises encoder 110, encoder 120, cross-text interaction module 130, and multilayer perceptron 140. Input text is provided to encoder 110. Background information is provided to encoder 120.

Encoder 110 and encoder 120 are operatively coupled to cross-text interaction module. Encoder 110 is operatively coupled to cross-text interaction module 130 to provide cross-text interaction module 130 with the input text encoded into a neural sentence embedding representation. Encoder 120 is operatively coupled to cross-text interaction module 130 to provide cross-text interaction module 130 with the background information (a.k.a., background text) encoded into a neural sentence embedding representation.

Based on the neural sentence embedding representation received from encoders 110 and 120, cross-text interaction module 130 analyzes the cross-text interactions between the input text and the background information. The representation generated by cross-text interaction module 130 and the neural sentence embedding representation of the background information from encoder 120 are fed to multi-layer perceptron 140

Multi-layer perceptron (MLP) 140 (which is a form of neural network based classifier) is used to classify the input text into at least two categories: hate speech or non-hate speech. Multi-layer perceptron 140 is trained to recognize the latent features associated with subtle and/or ambiguous hate speech. Using neural network based MLP 140 allows text classifier 100 to better classify subtle and/or ambiguous hate speech that does not have the strong surface features of explicit hate speech. MLP 140 may be network classifier trained with end-to-end labelled data using a standard cross-entropy loss as the error signal.

Figure 2:
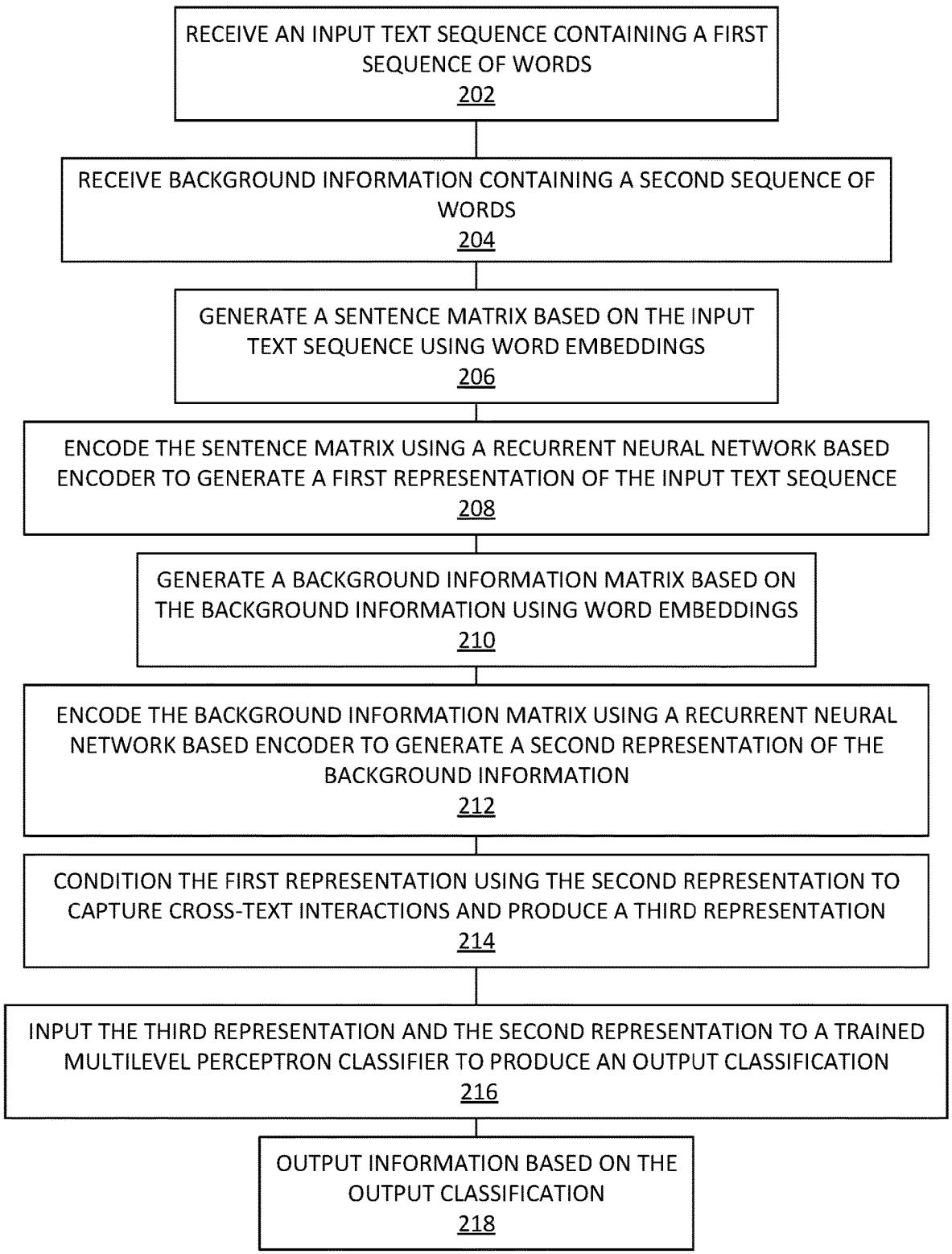
FIG. 2 is a flowchart illustrating a method of text classification.

FIG. 2 is a flowchart illustrating a method of text classification. An input text sequence (e.g., comment, post, etc.) containing a first sequence of words is received (202). For example, input text may be provided to encoder 110 of text classifier 100. The input text received by encoder 110 may be, for example, a comment on an article, a social media post, etc.

Background information containing a second sequence of words is received (204). For example, background information text may be provided to encoder 120 of text classifier 100. The background information may be the text from, for example, one or more of: the article summary on which the comments are made; the previous comment in the comment thread; external knowledge on the entities and/or key phrases mentioned in the sentence. The external knowledge on the entities and/or key phrases mentioned in the sentence may be obtained, for example, from online sources such as Wikipedia and Urban Dictionary.

A sentence matrix is generated based on the input text sequence using word embeddings (206). For example, the input text may be passed to an embedding module that is part of encoder 110. The task of the embedding module of encoder 110 is to generate a sentence matrix given a textual sentence. In the embedding module of encoder 110, a word embedding sentence matrix is built for the input text using word embeddings.

The sentence matrix is encoded using a recurrent neural network based encoder to generate a first representation of the input text sequence (208). For example, encoder 110 may encode the input text using a recurrent neural network based encoder. Encoder 110 may use Recurrent Neural Networks (RNNs) with long short-term memory (LSTM) units as encoders for the sentence representation. In other words, the input text is encoded using a LSTM based approach.

An advantage of an LSTM, for example, is that it contains memory cells which can store information for a long period of time. Thus, an LSTM does not suffer from the vanishing gradient problem. LSTMs contain memory cells that can remember previous state information as well as three different types of gates: input gates (see Equation 2), forget gates (see Equation 3), and output gates (see Equation 4). The gates control how much of the information is remembered. Given an input vector $x_t$ at a time t, and the previous output as $h_{t-1}$ and previous cell output $c_{t-1}$, the current cell state and output are computed according to the following equations:

$$H = \begin{bmatrix} x_t \\ h_{t-1} \end{bmatrix} \quad (1)$$

$$i_t = \sigma(W^i H + b^i) \quad (2)$$

$$f_t = \sigma(W^f H + b^f) \quad (3)$$

$$o_t = \sigma(W^o H + b^o) \quad (4)$$

$$o_t = \sigma(W^o H + b^o) \quad (5)$$

$$c_t = f_t \odot c_{t-1} + i_t \odot \tanh(W^c H + b^c) \quad (6)$$

$$h_t = o_t \odot \tanh(c_t) \quad (7)$$

Encoder 110 may utilize, for example, an attention mechanism to improve classification performance by assigning higher weightage to relevant words of the sentence. It should be understood that attention can be intra-attention (also known as self-attention), wherein attention weights are learned from the same input sentence which is getting represented, or it can be an inter-attention mechanism wherein attention weights for an input text encoding are learned from the encoded representations of related text. In an embodiment, encoder 110 uses intra-attention on the input text.

A background information matrix is generated based on the input text sequence using word embeddings (210). For example, the background information text may be passed to an embedding module that is part of encoder 120. The task of the embedding module of encoder 120 is to generate a background information sentence matrix given a textual sentence of the background information. In the embedding module of encoder 120, a word embedding sentence matrix (a.k.a., background information matrix) is built for the background information text using word embeddings.

The background information matrix is encoded using a recurrent neural network based encoder to generate a first representation of the background information (212). For example, encoder 120 may encode the input text using a recurrent neural network based encoder. Encoder 120 may use Recurrent Neural Networks (RNNs) with long short-term memory (LSTM) units as encoders for the sentence representation. In other words, the input text is encoded using a LSTM based approach. Encoder 120 may utilize, for example, an attention mechanism to improve classification performance by assigning higher weightage to relevant words of the sentence. In an embodiment, encoder 120 uses intra-attention on the background information text.

The first representation is conditioned using the second representation to capture cross-text interactions and produce a third representation (214). For example, the representation of the input text received from encoder 110 may be conditioned using the representation of the background text received from encoder 120 by cross-text interaction module 130. The conditioning done by the cross-text interaction module 130 may use an inter-attention mechanism. In other words, cross-text interaction module 130 may implement an inter-attention mechanism between the input comment text representation received from encoder 110 and background information representation received from encoder 120.

For example, let $Y_C$ be the output matrix (i.e., representation) received from encoder 110 and $Y_B$ be the output matrix received from encoder 120. The output of cross-text interaction module 130 may be generated according to the following equations:

$$M_1 = \tanh(W_1 Y_C + W_2 Y_B) \quad (8)$$

$$\alpha = \text{softmax}(W^T M_1) \quad (9)$$

$$O_1 = \alpha Y_C \quad (10)$$

The third representation and the second representation are input to a trained multi-level perceptron classifier to produce an output classification (216). For example, at least the conditioned representation of the input text received from cross-text interaction module 130 and the representation of the background information received from encoder 120 may be input to MLP 140. The output of MLP 140 may correspond to a classification of the input text as hate speech or non-hate speech (or a likelihood thereof.)

Information is output based on the output classification (218). For example, a processor implementing one or more of the elements of text classifier 100 may send, cause to be displayed, or store an indicator and/or message regarding the classification of the input text as hate speech or non-hate speech.

Figure 3:
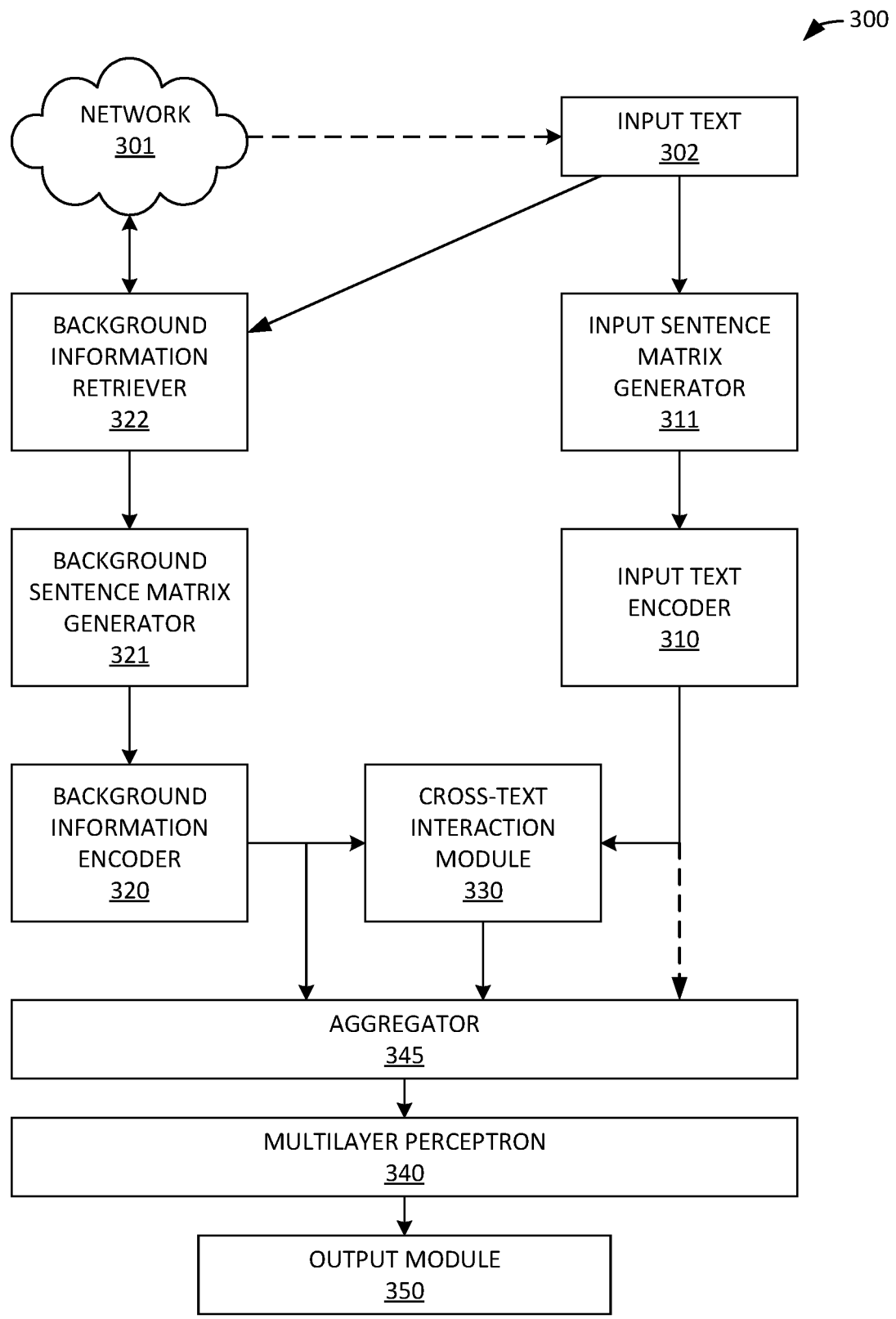
FIG. 3 is a block diagram illustrating a text classifier.

FIG. 3 is a block diagram illustrating a text classifier. In FIG. 3, text classifier 300 comprises network 301, input text 302, input sentence matrix generator 311, input text encoder 310, background information retriever 322, background sentence matrix generator 321, background information encoder 320, cross-text interaction module 330, aggregator 345, multi-layer perceptron 340, and output module 350.

Network 301 may be, or be part of, the internet. For example, input text 302 may be retrieved from, or be displayed on, a website, social media platform, etc. Input text 302 is provided to input sentence matrix generator 311 and background information retriever 322. Input sentence matrix generator 311 generates a sentence matrix from input text 302 using word embeddings. In other words, input sentence matrix generator 311 builds a word embedding sentence matrix for the input text using word embeddings.

Background information retriever 325 may obtain, from network 301, text from, for example, one or more of: the article summary on which the comments are made; the previous comment in the comment thread; external knowledge on the entities and/or key phrases mentioned in the sentence. The external knowledge on the entities and/or key phrases mentioned in the sentence may be obtained, for example, from sources available via network 301 such as Wikipedia and Urban Dictionary.

The background information retrieved by background information retriever 325 is provided to background sentence matrix generator 321. Background sentence matrix generator 321 generates a sentence matrix from background information text using word embeddings. In other words, background information matrix generator 321 builds a word embedding sentence matrix for the background information text using word embeddings.

The word embedding sentence matrix for the input text generated by input sentence matrix generator 311 is provided to input text encoder 310. Input text encoder 320 uses a recurrent neural network based encoder to generate a first representation of the input text sequence. Input text encoder 310 encodes the input text using a recurrent neural network based encoder. Input text encoder 310 uses Recurrent Neural Networks (RNNs) with long short-term memory (LSTM) units as encoders for the sentence representation. In other words, the input text is encoded using a LSTM based approach. This approach has been described with reference to equations 1-7 and thus, for the sake of brevity, will not be repeated herein. Encoder 310 uses intra-attention on the input text as described herein.

The word embedding sentence matrix for the background information text generated by background information sentence matrix generator 321 is provided to background information encoder 320. Background information encoder 320 uses a recurrent neural network based encoder to generate a first representation of the background information text sequence. Background information encoder 320 encodes the input text using a recurrent neural network based encoder. Background information encoder 320 uses Recurrent Neural Networks (RNNs) with long short-term memory (LSTM) units as encoders for the sentence representation. In other words, the input text is encoded using a LSTM based approach. This approach has been described with reference to equations 1-7 and thus, for the sake of brevity, will not be repeated herein. Encoder 320 also uses intra-attention on the background information text as described herein.

The input text representation from input text encoder 320 is conditioned by cross-text interaction module 330 using the background information representation from background information encoder 320. This conditioning captures cross-text interactions. Cross-text interaction module 330 produces a third representation that includes the cross-text interactions between the input text 302 and the background information retrieved by background information retriever 325.

The conditioning done by the cross-text interaction module 330 uses an inter-attention mechanism. In other words, cross-text interaction module 330 implements an inter-attention mechanism between the input comment text representation received from encoder 310 and background information representation received from encoder 320. This inter-attention mechanism has been described with reference to equations 8-10 and thus, for the sake of brevity, will not be repeated herein.

The output of background information encoder 320, the output of cross-text interaction module 330, and optionally the output of encoder 310 are provided to aggregator 345. Aggregator 345 combines the representations received. The output of aggregator 345 is fed to MLP 340. MLP 340 has been trained using labelled data end-to-end using cross-entropy loss as the error signal.

The output of MLP 340 is provided to output module 350. Output module 350 outputs information based on the output classification received from MLP 340. For example, a processor implementing one or more of the elements of text classifier 300 may send, cause to be displayed, or store an indicator and/or message regarding the classification of the input text as hate speech or non-hate speech.

Figure 4:
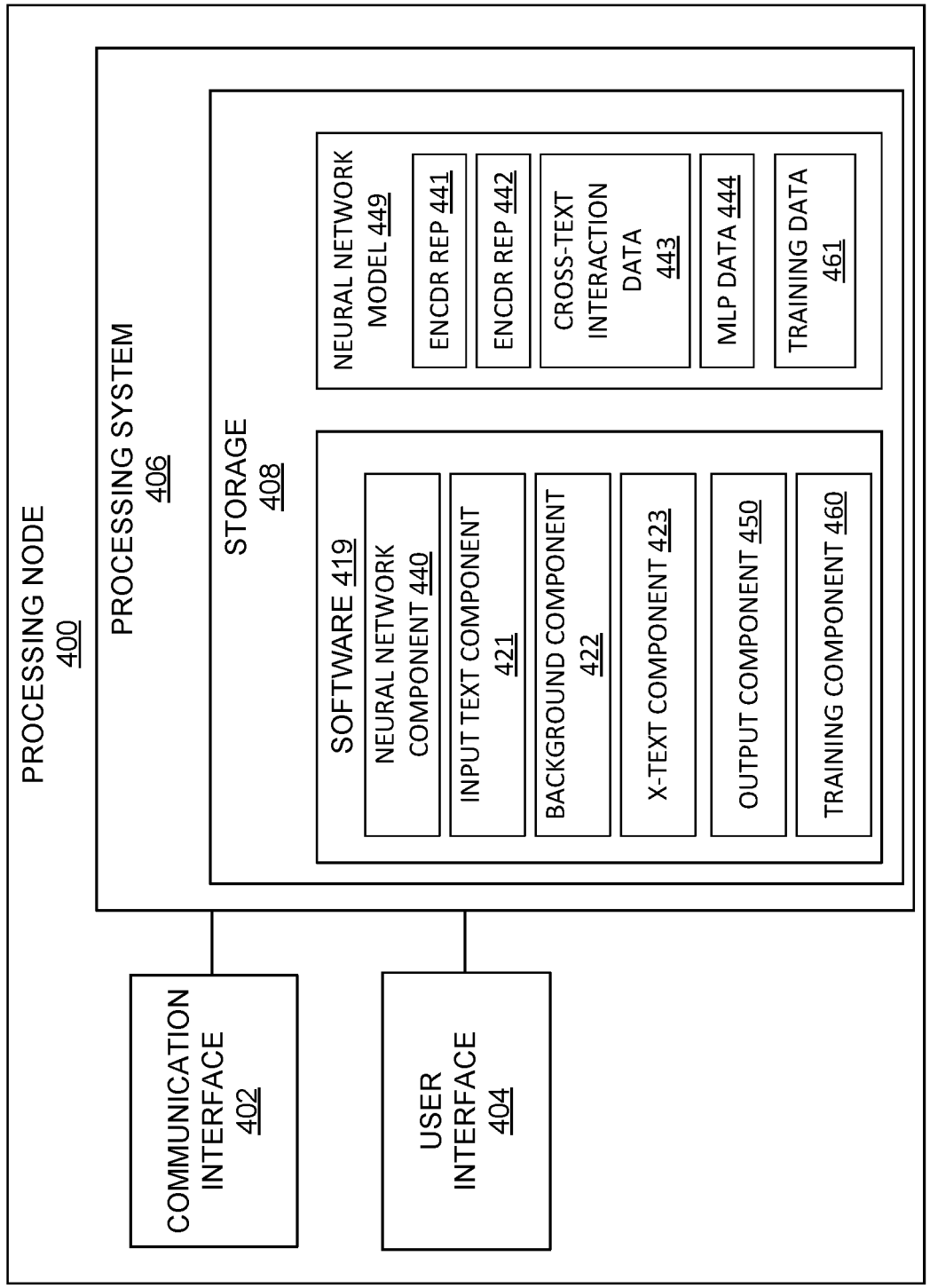
FIG. 4 is a block diagram illustrating a system that classifies text.

FIG. 4 is a block diagram illustrating a system that classifies text. In FIG. 4 processing node 400 comprises communication interface 402, user interface 404, and processing system 406 in communication with communication interface 402 and user interface 404. Processing node 400 is capable of classifying text as described herein. Processing system 406 includes storage 408, which can comprise a disk drive, flash drive, memory circuitry, or other memory device. Storage 408 can store software 419 which is used in the operation of the processing node 400. Storage 408 may include a disk drive, flash drive, data storage circuitry, or some other memory apparatus. Storage 408 may also store a neural network based model 449.

Software 419 may include computer programs, firmware, or some other form of machine-readable instructions, including an operating system, utilities, drivers, network interfaces, applications, or some other type of software.

Software 419 includes neural network component 440, input component 421, background component 422, cross-text interaction component 423, output component 450, and optionally training component 460. Neural network component 440 may be, comprise, or correspond to software that implements MLP 140 and/or MLP 340. Input text component 421 may be, comprise, or correspond to software that implements encoder 110, input sentence matrix generator 311, and/or input text encoder 310. Background component 422 may be, comprise, or correspond to software that implements encoder 120, background information retriever 322, background sentence matrix generator 321, and/or background encoder 320. Cross-text interaction component 423 may be, comprise, or correspond to software that implements cross-text interaction module 130, and/or cross-text interaction module 330. Output component 450 may be, comprise, or correspond to software that implements output module 350. Training component 460 may be, comprise, or correspond to software that trains one or more of the neural networks used by classification system 100 and/or classification system 300.

Storage 408 may also store a neural network based model 449. Neural network based model 449 includes encoder representation 441, encoder representation 442, cross-text interaction output 443, multi-level perceptron output 444, and optionally training data 461. Encoder representation 441 may be, comprise, or correspond to data used to implement encoder 110, input sentence matrix generator 311, and/or input text encoder 310. Encoder representation 442 may be, comprise, or correspond to data used to implement encoder 120, background information retriever 322, background sentence matrix generator 321, and/or background encoder 320. Cross-text interaction data may be, comprise, or correspond to data used to implement cross-text interaction module 130, and/or cross-text interaction module 330. MLP data 444 may be, comprise, or correspond to data used to implement MLP 140 and/or MLP 340. Training data 461 may be, comprise, or correspond to data used to train one or more of the neural networks used by classification system 100 and/or classification system 300.

Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

Figure 5:
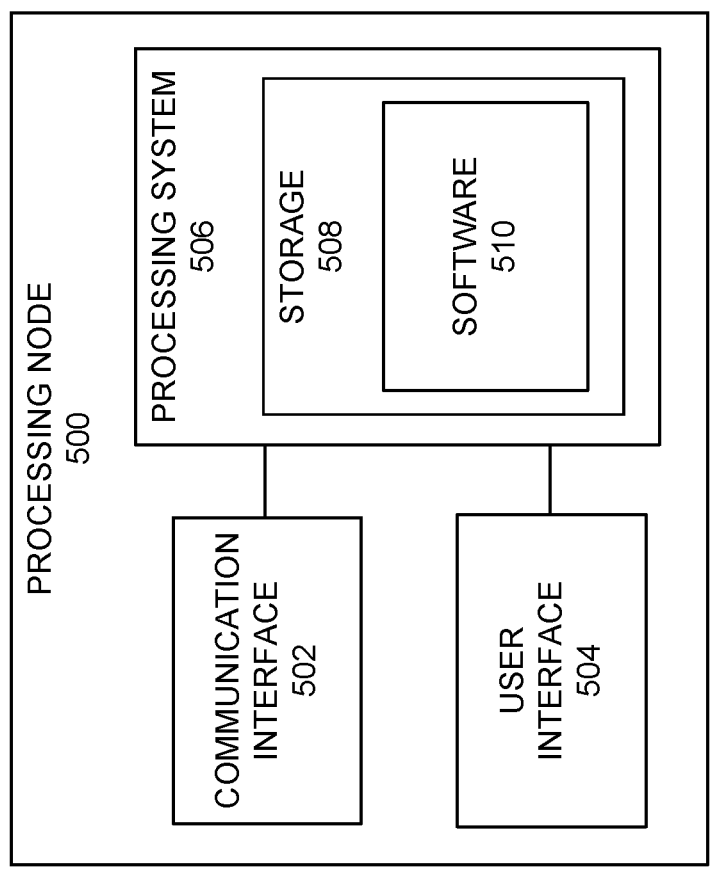
FIG. 5 illustrates an example processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

An example use of processing node 500 includes text classification system 100, text classification system 300, and or implementing the methods described herein (e.g., the process described herein with reference to FIG. 2.) Processing node 500 can also be an adjunct or component of a network element, such as an element of network 301.

In an embodiment, processing node 500 stores a neural network model, an input component, a background information, and an output component. The neural network based model has been trained to identify hate speech for an input text sequence. The neural network based model comprises: a first encoder, a second encoder, a cross-text interaction module, and a neural network classifier.

The first encoder generates a first representation based on the input text sequence. The first encoder includes a first embedding module that generates a sentence matrix based on the input text sequence. The first encoder also includes a first neural network encoder that generates the first representation based on the sentence matrix. The second encoder that generates a second representation based on background information. The second encoder includes a second embedding module that generates a background information matrix based on the background information. The second encoder includes a second neural network encoder that generates the second representation based on the background information matrix.

The cross-text interaction module generates a third representation based on the first representation conditioned on the second representation. The neural network classifier receives the second representation and the third representation. The input component receives the input text sequence containing the first sequence of words. The background information component receives the background information containing the second sequence of words. The processor determines a classification for the input text sequence using the neural network model. And, the output component outputs information based on the classification.

The input text sequence may comprise a comment posted in association with a news article. The background information may comprise a summary associated with the news article. The background information comprises at least one previous comment posted in association with the news article. The comment may be posted to a first website and the background information may comprise information retrieved from a second website external to first website where the information retrieved from the second website being associated with an entity referenced in the comment by the second website.

The comment may be posted to a first website and the background information may be information retrieved from a second website external to first website where the information retrieved from the second website being associated, by the second website, with a key phrase extracted from the comment.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method, comprising:
providing a neural network model which has been trained to identify hate speech for an input text sequence, the input text sequence extracted from a comment on a website, the neural network model comprising:
a first encoder that generates a first representation based on the input text sequence, the first encoder including a first embedding module that generates a sentence matrix based on the input text sequence, the first encoder including a first neural network encoder that generates the first representation based on the sentence matrix;
a second encoder that generates a second representation based on background information, the background information extracted from a source external to the comment on the website, the second encoder including a second embedding module that generates a background information matrix based on the background information, the second encoder including a second neural network encoder that generates the second representation based on the background information matrix;
a cross-text interaction module that generates a third representation based on the first representation conditioned on the second representation; and,
a neural network classifier that receives the second representation and the third representation;
receiving the input text sequence containing a first sequence of words;
receiving the background information containing a second sequence of words;
with a processor, determining a classification for the input text sequence using the neural network model; and,
outputting information based on the classification.

2. The method of claim 1, wherein receiving the background information is performed by a background information retriever module.

3. The method of claim 1, wherein the input text sequence comprises a comment posted in association with a news article.

4. The method of claim 3, wherein the background information comprises a summary associated with the news article.

5. The method of claim 3, wherein the background information comprises at least one previous comment posted in association with the news article.

6. The method of claim 3, wherein the comment is posted to a first website and the background information comprises information retrieved from a second website external to the first website, the information retrieved from the second website being associated with an entity referenced in the comment by the second website.

7. The method of claim 3, wherein the comment is posted to a first website and the background information comprises information retrieved from a second website external to the first website, the information retrieved from the second website being associated, by the second website, with a key phrase extracted from the comment.

8. A method, comprising:
receiving an input text sequence containing a first sequence of words, the input text sequence extracted from a comment on a website;
receiving background information containing a second sequence of words, the background information extracted from a source external to the comment on the website;
generating a sentence matrix based on the first sequence of words;
encoding the sentence matrix using a recurrent neural network based encoder to generate a first representation of the first sequence of words;
generating a background information matrix based on the second sequence of words;
encoding the background information matrix using the recurrent neural network based encoder to generate a second representation of the second sequence of words;
generating a third representation by conditioning the first representation using the second representation; and,
generating an output classification by inputting the third representation and the second representation to a trained multilevel perceptron classifier.

9. The method of claim 8, further comprising:
outputting information based on the output classification.

10. The method of claim 8, wherein conditioning the first representation using the second representation captures cross-text interactions to generate the third representation.

11. The method of claim 8, wherein the sentence matrix is generated using word embedding.

12. The method of claim 8 wherein the background information matrix is generated using word embedding.

13. The method of claim 8 wherein the sentence matrix and the background information matrix are generated using word embedding.

14. The method of claim 8 wherein the recurrent neural network uses long short-term memory units as encoders.

15. A system, comprising:

memory that stores a neural network model which has been trained to identify hate speech for an input text sequence, the input text sequence extracted from a comment on a website, the neural network model comprising:

a first encoder that generates a first representation based on the input text sequence, the first encoder including a first embedding module that generates a sentence matrix based on the input text sequence, the first encoder including a first neural network encoder that generates the first representation based on the sentence matrix;

a second encoder that generates a second representation based on background information, the background information extracted from a source external to the comment on the website, the second encoder including a second embedding module that generates a background information matrix based on the background information, the second encoder including a second neural network encoder that generates the second representation based on the background information matrix;

a cross-text interaction module that generates a third representation based on the first representation conditioned on the second representation; and, a neural network classifier that receives the second representation and the third representation;

an input component that receives the input text sequence;

a background information component that receives the background information;

a processor that determines a classification for the input text sequence using the neural network model; and, an output component that outputs information based on the classification.

16. The system of claim 15, wherein the input text sequence comprises a comment posted in association with a news article.

17. The system of claim 16, wherein the background information comprises a summary associated with the news article.

18. The system of claim 17, wherein the background information comprises at least one previous comment posted in association with the news article.

19. The system of claim 16, wherein the comment is posted to a first website and the background information comprises information retrieved from a second website external to first website, the information retrieved from the second website being associated with an entity referenced in the comment by the second website.

20. The system of claim 16, wherein the comment is posted to a first website and the background information comprises information retrieved from a second website external to first website, the information retrieved from the second website being associated, by the second website, with a key phrase extracted from the comment.

* * * * *